United States Patent [19]
Hirai

[11] Patent Number: 6,108,496
[45] Date of Patent: Aug. 22, 2000

[54] EXPOSURE CONTROL SYSTEM FOR CAMERA

[75] Inventor: Isamu Hirai, Tokyo, Japan

[73] Assignee: Asahi Kogaku Kogyo Kabushiki Kaisha, Tokyo, Japan

[21] Appl. No.: 09/296,273

[22] Filed: Apr. 22, 1999

[30] Foreign Application Priority Data

Apr. 24, 1998 [JP] Japan ................................. 10-114903

[51] Int. Cl.[7] .................................................. G03B 15/03
[52] U.S. Cl. ........................... 396/155; 396/168; 396/169; 396/170
[58] Field of Search .................................. 396/155, 168, 396/169, 170, 166, 233, 242, 165, 159, 61, 106

[56] References Cited

U.S. PATENT DOCUMENTS

| | | |
|---|---|---|
| 4,345,825 | 8/1982 | Matteson et al. ...................... 396/242 |
| 4,772,910 | 9/1988 | Fields ..................................... 396/165 |
| 4,801,964 | 1/1989 | Desormeaux .......................... 396/159 |
| 4,812,872 | 3/1989 | Desormeaux .......................... 396/165 |
| 4,963,915 | 10/1990 | Ikemura et al. ........................ 396/61 |
| 4,969,005 | 11/1990 | Tokunaga ............................... 396/165 |
| 5,257,063 | 10/1993 | Ishimaru et al. ....................... 396/106 |

*Primary Examiner*—Russell Adams
*Attorney, Agent, or Firm*—Greenblum & Bernstein, P.L.C.

[57] ABSTRACT

An exposure control system for a camera, which is provided with a strobe, includes a photometry system that measures brightness of an object; an exposure parameter determining system that determines exposure parameters in accordance with the brightness detected by the photometry system; a judging system that judges whether a daylight synchro-flash photographing is executed; and an exposure parameter changing system that changes at least one of the exposure parameters determined by the exposure parameter determining system when it is judged that the daylight synchro-flash photographing is executed.

14 Claims, 5 Drawing Sheets

EXPOSURE CONTROL SYSTEM FOR CAMERA

BACKGROUND OF THE INVENTION

The present invention relates to an exposure control system for cameras, cameras employing the exposure control system, and a method for controlling an exposure operation of cameras.

Conventionally, electronically controlled cameras have employed exposure control systems for measuring brightness of an object with use of a photometry system, and calculating an exposure value (Ev) based on the measured brightness. Based on the exposure value (Ev), an appropriate combination of exposure parameters, i.e., an f-number (Av: an aperture value) and a shutter speed (Tv: a time value) are determined.

Recently, a multi-point photometry system has been developed. The multi-point photometry system is capable of dividing an objective area into a plurality of measuring areas, and measuring the brightness for respective measuring areas. The exposure control system employing the multi-point photometry system is capable of determining the exposure value more appropriately compared with the exposure control system employing a single-point photometry system which have only one area.

In a camera which employs the exposure control system utilizing a multi-point photometry system, if a brightness range of an object is out of a latitude of a film, the exposure value is determined to have an average value so that a density or brightness of the entire image is well balanced. Alternatively, the exposure value is determined such that an image of an object having the lowest brightness corresponds to the lower limit of the latitude of the film, and let the image of the object having the higher brightness than upper limit of the latitude photographed as an over-exposed image.

In a camera that employs an exposure control system utilizing a single-point photometry, the exposure value should be determined to have a value corresponding to an average of brightness overall of the photometry area. In such a camera, when a photographing operation is performed in daytime, dark portions of a high-contrast object tend to be under-exposed since the bright portions of the object raise the average exposure value of the frame.

That is, due to the bright portions of the object, the brightness value Bv, which may be averaged brightness values of the dark and bright portions, is greater than the brightness value of the dark portions alone. Accordingly, for the dark portions, the obtained exposure value Ev may be greater than necessary. Therefore, the combination of the time value Tv and aperture value Av, which are determined based on such an exposure value, result in the under-exposed condition of the dark portions of the object.

To avoid such an under-exposed condition, it is detected whether the high-contrast condition, or a rear light (contrejour) condition is occurring, and exposure compensation is done. That is, the aperture size (i.e., the aperture value Av) and/or the shutter speed (i.e., the time value Tv) are decreased. However, over-compensation makes bright portions of the image over-exposed, and thus it is difficult to determine the appropriate compensation amount.

Conventionally, to photograph a relatively dark object with a bright background, a daylight synchro-flash photographing is executed.

It is preferable, when the daylight synchro-flash photographing is performed, the dark object is photographed with an appropriate exposed condition and the background is photographed as a bright image. If auxiliary illumination by the strobe is too strong, however, the photographs maybe over-exposed, and may include unnatural highlights and shadows. Thus, conventionally, it has been said that the auxiliary light should be made slightly weaker than required in order to take the appropriately exposed image of the dark object. If the contrast of an object is relatively high, however, dark portions of the object may not be sufficiently illuminated and remain dark, and the background may also be photographed as a dark image. When the multi-point photometry system is utilized, an improved exposure condition may be achieved than with the single-point photometry system. However, if an extremely bright object, such as the sun, is in the frame, the exposure control system determines the exposure condition mainly based on the extremely bright object. In such a case, the dark object may still remain under-exposed, and the background is also photographed as a dark image.

SUMMARY OF THE INVENTION

It is therefore an object of the present invention to provide an improved exposure control system for cameras capable of taking appropriately exposed images of dark objects as well as bright backgrounds by the daylight synchro-flash photographing.

For the above-object, according to the invention, there is provided an exposure control system for a camera provided with a strobe, including: a photometry system that measures brightness of an object; an exposure parameter determining system that determines exposure parameters in accordance with the brightness detected by the photometry system; a judging system that judges whether a daylight synchro-flash photographing is executed; and an exposure parameter changing system that changes at least one of the exposure parameters determined by the exposure parameter determining system when it is judged that the daylight synchro-flash photographing is executed.

With this configuration, when the daylight synchro-flash photographing is executed, the exposure parameters can be automatically changed appropriately.

Specifically, the exposure parameters include an aperture value Av and a time value Tv of an APEX system, and at least one of the aperture value Av and the time value Tv may be changed when the daylight synchro-flash photographing is executed.

In particular, if the photometry system includes a single-point photometry system for obtaining a brightness value, the judging system may be configured to judge that the daylight synchro-flash photographing is executed when conditions (a) and (b) are satisfied:

(a) the strobe is used; and
(b) the brightness value is greater than a predetermined value.

Alternatively, if the photometry system includes a multi-point photometry system for obtaining at least two brightness values corresponding to a central area and a peripheral area of a photographing frame, the judging system may be constituted to judge that the daylight synchro-flash photographing is executed when conditions (c) and (d) are satisfied;

(c) the strobe is used; and
(d) a subtraction of the brightness value corresponding to the central area from the brightness value corresponding to the peripheral area is greater than a predetermined threshold value.

Alternatively, the judging system may judge that the daylight synchro-flash photographing is executed when condition (e) is satisfied, and further, one of conditions (f) or (g) is satisfied:

(e) the strobe is used;

(f) the weighted and averaged brightness value is greater than a first predetermined threshold value; and (g) a subtraction of the brightness value corresponding to the central area from the brightness value corresponding to the peripheral area is greater than a second predetermined threshold value.

Further alternatively, the judging system may judge that the daylight synchro-flash photographing is executed when conditions (h), (i) and (j) are satisfied:

(h) the strobe is used;

(i) the weighted and averaged brightness value is greater than a first predetermined threshold value; and (j) a subtraction of the brightness value corresponding to the central area from the brightness value corresponding to the peripheral area is greater than a second predetermined threshold value.

Further optionally, the photometry system may include a multi-point photometry system for obtaining a plurality of brightness values corresponding to a plurality of areas within a photographing frame, and wherein the judging system judges that the daylight synchro-flash photographing is executed when conditions (k) and (m) are satisfied:

(k) the strobe is used; and (m) a difference between two of the plurality of brightness values is greater than a predetermined threshold value. In this case, the two of the plurality of brightness values may be maximum and minimum brightness values of the plurality of brightness values. Alternatively, the two of the plurality of brightness values comprise brightness values of a central area of the plurality of areas and a peripheral area of the plurality of areas.

According to another aspect of the invention, there is provided a camera, which is provided with: a strobe; a photometry system that measures brightness of an object; an exposure parameter determining system that determines exposure parameters in accordance with the brightness detected by the photometry system; a judging system that judges whether a daylight synchro-flash photographing is executed; and an exposure parameter changing system that changes at least one of the exposure parameters determined by the exposure parameter determining system when it is judged that the daylight synchro-flash photographing is executed.

According to a further aspect of the invention, there is provided a method of controlling exposure of a camera which is provided with a strobe, including the steps of: measuring brightness of an object; determining exposure parameters in accordance with the detected brightness; judging whether a daylight synchro-flash photographing is executed; and changing at least one of the exposure determined parameters when it is judged that the daylight synchro-flash photographing is executed.

DESCRIPTION OF THE PREFERRED EMBODIMENTS

First through fourth embodiments of the exposure control system according to the present invention will be described hereinafter with reference to the accompanying drawings.

Figure 1:
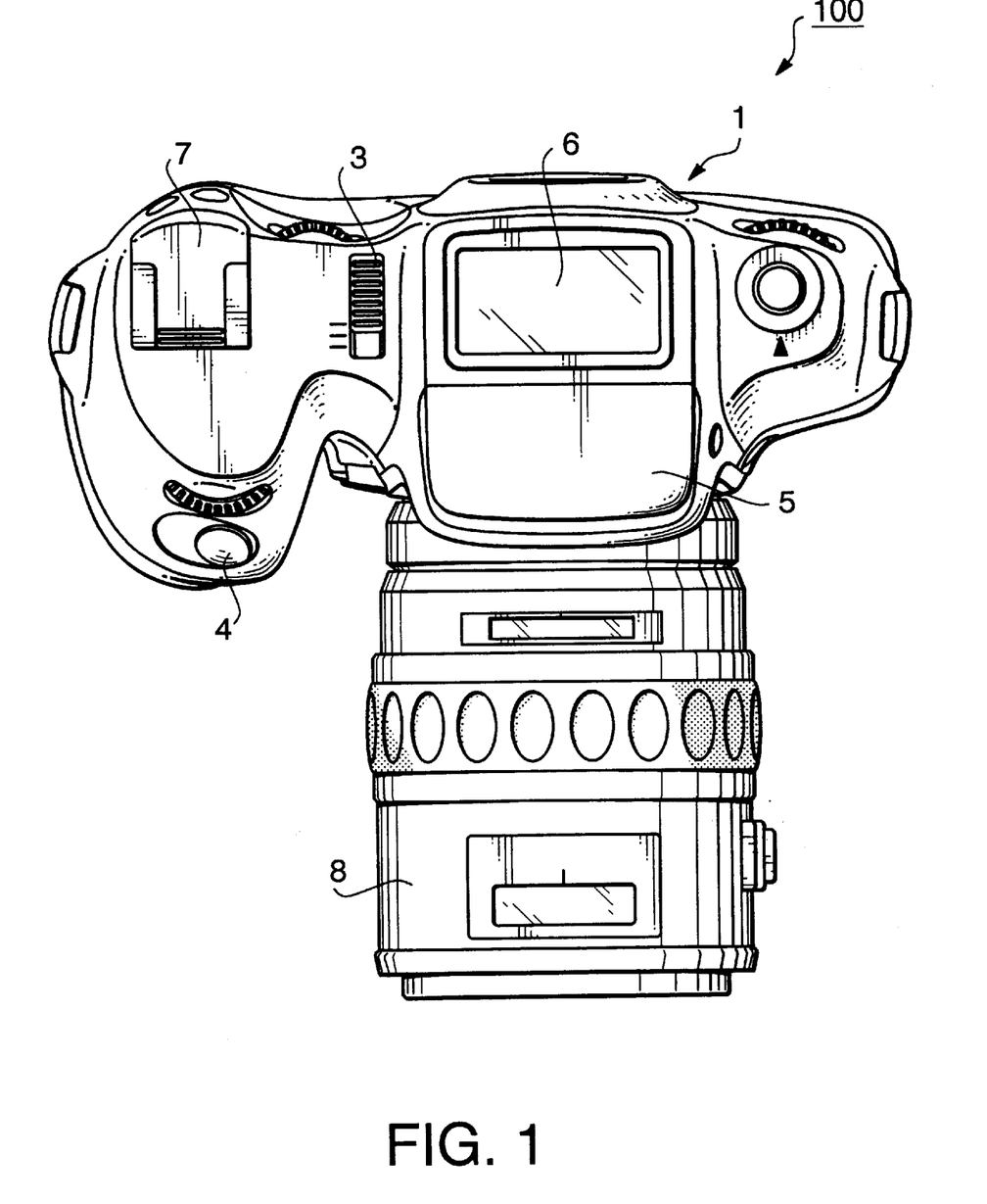
FIG. 1 is a plan view of a camera employing an exposure control system according to the present invention.

FIG. 1 is a plan view of a camera 100 employing an exposure control system to which the invention is applied.

As shown in FIG. 1, the camera 100 is provided with a body 1, a power switch 3, a shutter button 4, a liquid crystal display 6, an accessory shoe 7, and a photographing lens 8.

Figure 2:
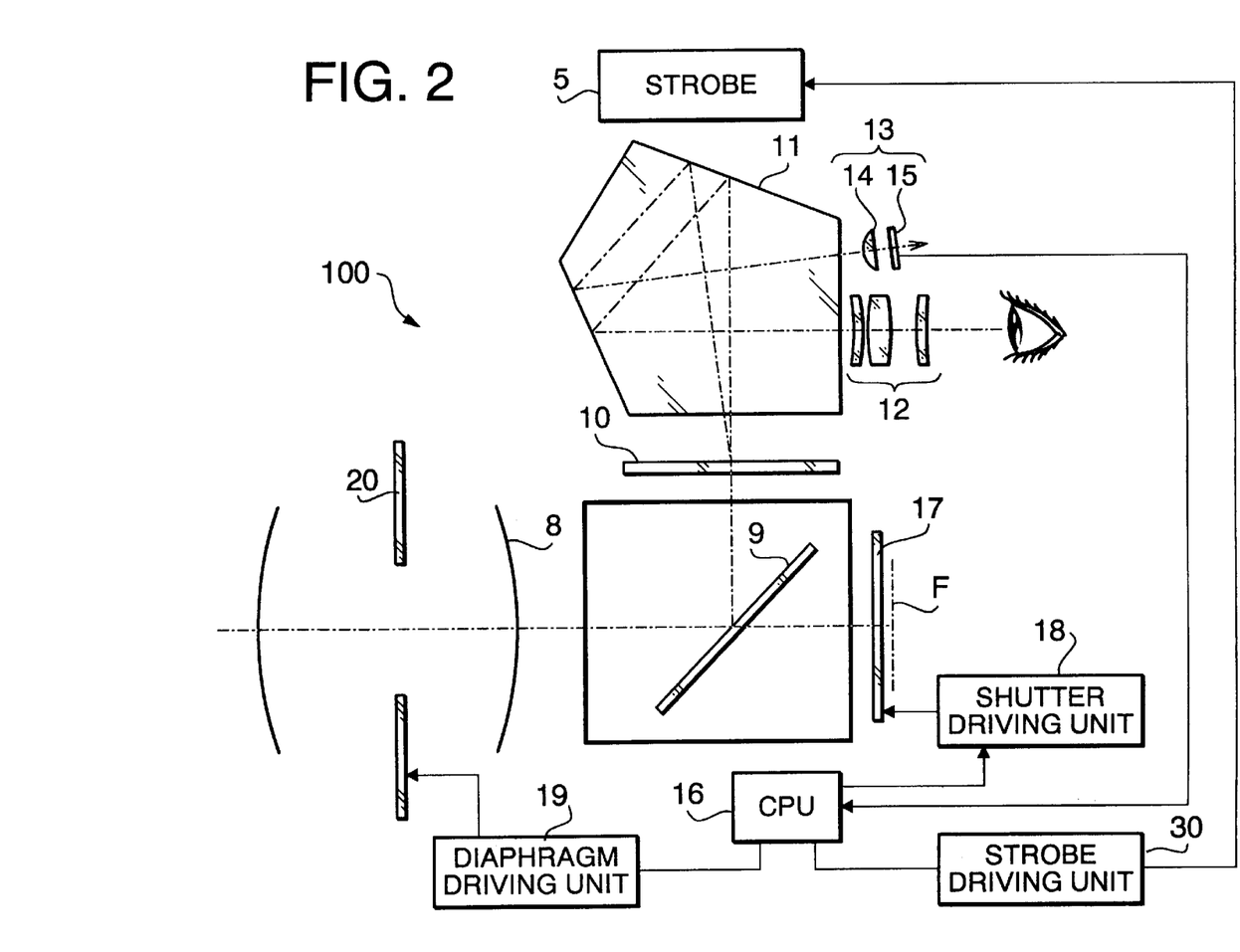
FIG. 2 schematically shows an arrangement of optical elements of the camera shown in FIG. 1.

FIG. 2 schematically shows an arrangement of optical elements of the camera 100. In the body 1, a quick return mirror 9, a focusing screen 10, a penta prism 11, a finder optical system 12, a photometry unit 13, a shutter mechanism 17 and a film F are arranged. The focusing screen 10 and the film F are located at the same distance from the photographing lens 8. In the photographing lens 8, a diaphragm unit 20 is provided.

A control system of the camera 100 includes a CPU 16, a shutter driving unit 18 for driving the shutter mechanism 17, a diaphragm driving unit 19 for driving the diaphragm unit 20, and a strobe drive circuit 30 for driving the strobe 5.

When the film F is not being exposed to light, the quick return mirror 9 is located at a lower position as shown in FIG. 2, at which the quick return mirror 9 inserted in the optical axis of the lens 8. Light passed through the photographing lens 8 is reflected by the quick return mirror 9 toward the focusing screen 10, and forms an image of the object thereon. The image formed on the focusing screen 10 is observed, via the penta prism 11, through the finder optical system 12.

The photometry unit 13 has a lens 14 and a Silicon Photo Diode (SPD) 15. The SPD 15 outputs a signal representative of a received amount of light which corresponds to a brightness of the image formed on the focusing screen 10.

The CPU 16 controls the operation of the camera 100. In particular, the CPU 16 calculates a brightness value Bv based on the signal received from the SPD 15. The CPU 16 also performs auto-focusing operation in accordance with a defocus amount obtained with use of a defocus detecting system (not shown).

Then, the CPU 16 controls the diaphragm driving unit 19 and the shutter driving unit 18 to adjust the aperture size and expose the film to light in accordance with the calculated aperture value Av and the time value Tv.

Figure 3:
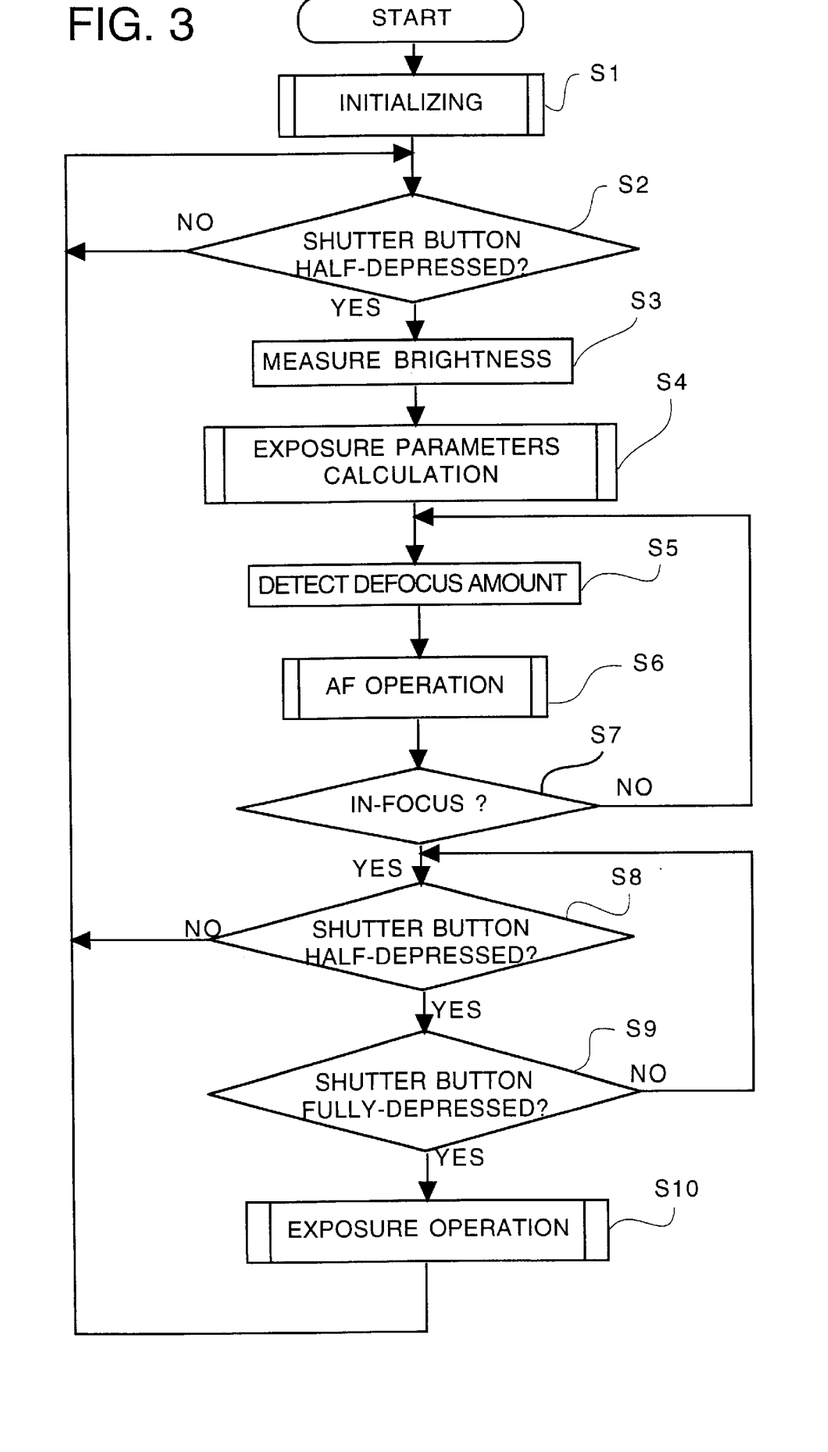
FIG. 3 is a main flowchart illustrating an overall operation of the camera.

FIG. 3 is a flowchart illustrating a main process of the camera 100 which is executed by the CPU 16. The main process is initiated when the power switch 3 is set to an ON position.

Firstly, an initializing process (S1) for initializing parameters, checking memories and the like is executed. In S2, it is judged whether the shutter button 4 is half-depressed. If the shutter button 4 is not depressed, control repeats S2 until the shutter button 4 is depressed. If it is judged that the shutter button 4 is half-pressed (S2: YES), control proceeds to S3, in which brightness of the object is measured with the photometry unit 13.

The CPU 16 receives the output of the SPD 15, and performs an exposure value calculation process for calculating the exposure value Ev (S4). The exposure value calculation process will be described in detail later.

Then, the CPU 16 performs AF (auto-focusing) operation (S5 and S6), in which a defocus amount is obtained utilizing the defocus amount detecting system (S5), calculates a moving amount of the lens 8 for canceling the defocus amount, and controls a lens driving unit (not shown) to move the focusing lens included in the photographing lens 8 along its optical axis by the calculated amount (S6).

In S7, the focusing condition is checked, and the AF operation is repeated until the defocus amount is reduced to an allowable amount. When the in-focus condition is detected (S7: YES), control goes to S8.

In S8, it is judged whether the shutter button 4 is at least half-depressed. It should be noted that determination in S8 is affirmative when the shutter button 4 is half-depressed or fully depressed. If it is judged that the shutter button 4 is not half-depressed (thus, not fully depressed) at S8, control goes back to S2. If it is judged, in S8, that the shutter button 4 is at least half-depressed, control goes to S9.

In S9, it is judged whether the shutter button 4 is fully depressed or not. If it is judged that the shutter button 4 is not fully depressed (i.e., the shutter button 4 is only half-depressed), control goes back to S8, and a loop of S8 and S9 is executed until the shutter button 4 is released or fully depressed. If it is judged that the shutter button 4 is fully depressed (S9: YES), the control goes to S10.

In S10, an exposure operation including a sequence of driving the diaphragm unit 20, retracting the quick return mirror 9, driving the shutter mechanism 17, returning the quick return mirror and winding the film F, is executed. Then, control goes to S2 to be ready for a subsequent photographing operation.

The exposure value calculation process executed at S4 in the main process will described hereinafter in detail.

First Embodiment

Figure 4:
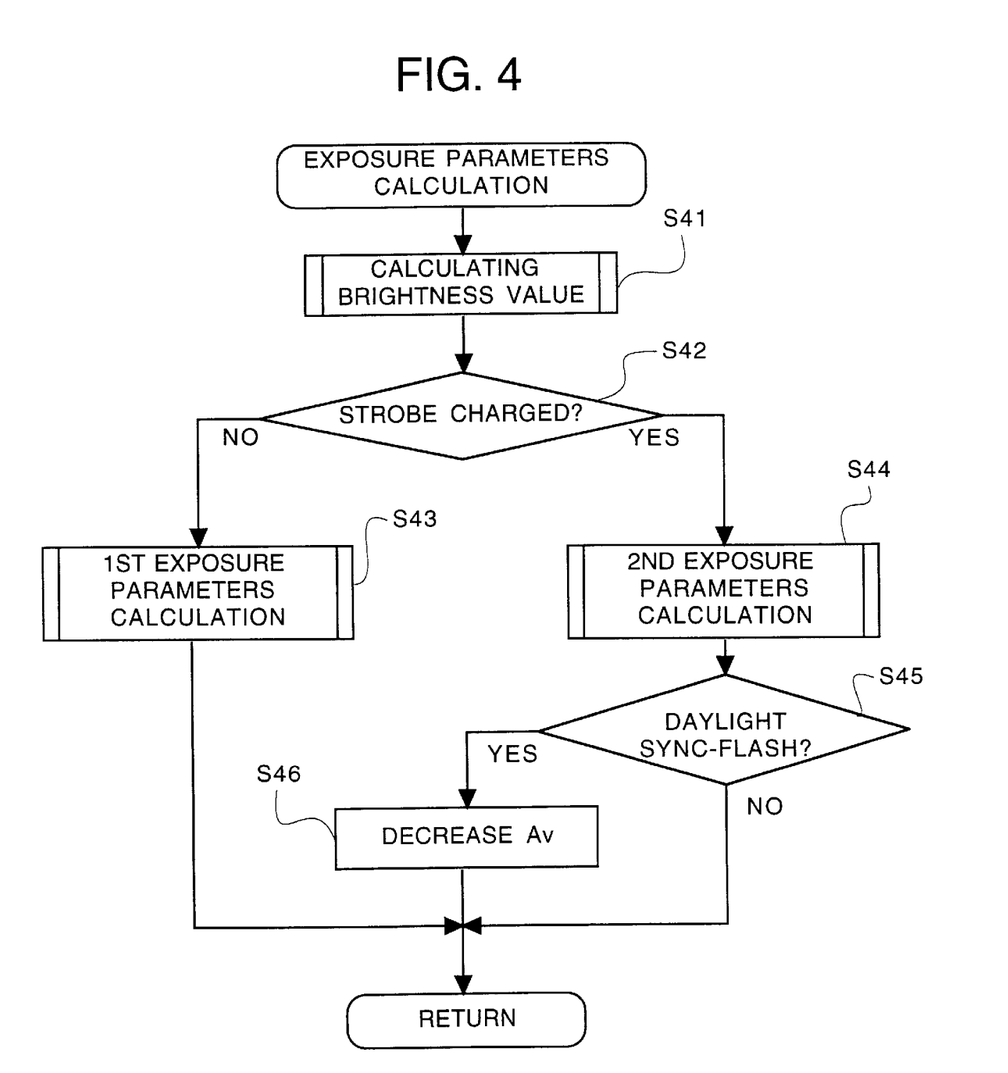
FIG. 4 is a flowchart illustrating an exposure parameters calculation process according to the present invention.

FIG. 4 is a flowchart showing the exposure parameters calculation process according to the first embodiment of the invention.

In S41, the CPU 16 calculates the brightness value Bv of the object based on the signal from the SPD 15.

In S42, it is judged whether the strobe drive circuit 30 has been charged. If the strobe drive circuit 30 is not charged (S42: NO), the CPU 16 judges that a photographing is to be performed without the strobe 5. Then, control goes to S43, and performs a first exposure parameters calculation process, in which the exposure value Ev is calculated based on the brightness value Bv obtained in S41 and a speed value Sv.

If it is judged that the strobe has been charged (i.e., the strobe is to be used) in S42, control goes to S44, and performs a second exposure parameters calculation process in S44, in which an exposure value Ev is determined based on the brightness value Bv and the speed value Sv, taking the effect of strobe flashing into account. Then, based on thus calculated exposure value, a combination of the time value Tv and the aperture value Av are calculated. In the second exposure parameters calculation process, the time value Tv is determined so that the shutter speed is less than a strobe synchronizing speed (e.g., 1/60 sec.). Thus, Tv is determined to be, for example, 6 or smaller.

In S45, it is judged whether the daylight synchro-flash photographing is to be performed. In the first embodiment, determination in S45 is executed by examining whether condition (1) is satisfied.

$$Bv > 10 \tag{1}$$

That is, if the brightness value Bv is greater than 10, it is judged that the daylight synchro-flash photographing is executed.

If the daylight synchro-flash photographing is to be executed (S45: YES), the CPU 16 decreases the aperture value Av in S46 by a predetermined amount. Specifically, in the first embodiment, the aperture value Av is decreased by one in S46.

When the aperture value Av is decreased, an additional effect can be obtained. A guide number Gn of a strobe exhibits the following relationship.

$$Gn = f\text{-number} \times D,$$

where D is an illuminating distance of the strobe.

As understood from the above relationship, the smaller the f-number is, the larger the farthest illumination distance D is. Accordingly, since the aperture value is reduced when the daylight synchro-flash photographing is executed, the illumination distance of the strobe 5 can be extended.

If it is judged that the daylight synchro-flash photographing is not executed (S45: NO), i.e., if the brightness value Bv is less than or equal to ten in this embodiment, the CPU 16 does not change the exposure parameters, i.e., the time value Tv or the aperture value Av.

In the above embodiment, whether the daylight synchro-flashing is executed is judged based on whether the brightness value Bv is greater than 10. This threshold value of the brightness value Bv is not limited to ten, and may be another value, for example eight.

Second Embodiment

In the second embodiment, a multi-point photometry system is employed. Accordingly, brightness in a plurality of divided areas of the object are measured.

Figure 5:
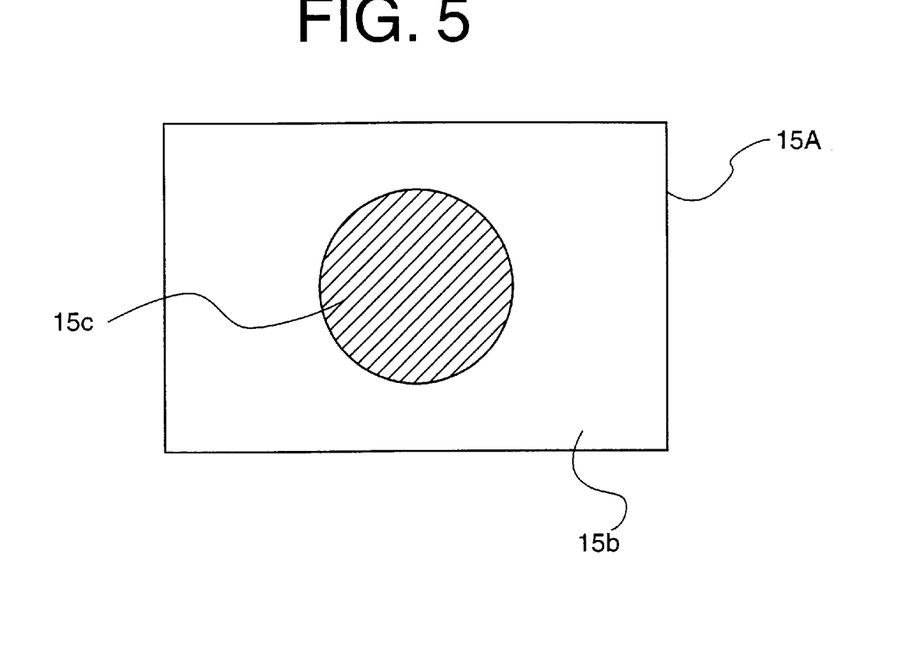
FIG. 5 schematically shows an example of a light receiving surface of an SPD having a plurality of light receiving areas.

FIG. 5 shows a light receiving surface of an SPD 15A, which is an example of the multi-point photometry system and used instead of the SPD 15 in the first embodiment.

As shown in FIG. 5, the light receiving surface of the SPD 15A is divided into two areas: a peripheral sensing area 15b and a central sensing area 15c. Based on the signals output of the sensing areas 15b and 15c, brightness values Bvb and Bvc are obtained, respectively.

An exposure parameters calculation process according to the second embodiment is substantially similar to that of the first embodiment as shown in FIG. 4.

In the second embodiment, in S41, two brightness values Bvb and Bvc are calculated based on the signals output by the sensing areas 15b and 15c. Then, a single brightness value Bv is determined as an average or a weighted average of the brightness values Bvb and Bvc. Alternatively, one of them (e.g., the brightness value Bvc) may be used as the brightness value Bv.

In S43 and S44, the exposure parameters are calculated based on the brightness value Bv, similarly to the first embodiment.

In S45, whether the daylight synchro-flash photographing is executed is judged based on a difference between the brightness values Bvb and Bvc.

Specifically, if condition (2) is satisfied, it is judged that the daylight synchro-flash photographing is executed.

$$(Bvb-Bvc)>2 \tag{2}$$

That is, if the brightness value Bvb corresponding to the peripheral area 15b is greater than the brightness value Bvc corresponding to the central area 15c by two, it is judged that he daylight synchro-flash photographing is executed.

Third Embodiment

The third embodiment is a modification of the second embodiment, which employs the multi-point photometry system. A process for calculating the exposure parameters is substantially similar to that of the first or second embodiment.

According to the third embodiment, in S41, the brightness values Bvb and Bvc are calculated, and then the brightness value Bv is calculated as an average of weighted average of the brightness values Bvb and Bvc. Alternatively, one of the brightness values Bvb and Bvc may be used as the brightness value Bv.

In S43 and S44, the exposure parameters are calculated based on the brightness value Bv, similarly to the first or second embodiment.

In S45, whether the daylight synchro-flash photographing is executed is judged as described below.

If one of the following conditions (3) and (4) are satisfied, it is judged that the daytime synchro-flash photographing executed.

$$Bv>10; \tag{3}$$

and $$(Bvb-Bvc)>2. \tag{4}$$

Fourth Embodiment

The fourth embodiment is a modification of the second embodiment, which employs the multi-point photometry system. A process for calculating the exposure parameters is substantially similar to that of the first, second or third embodiment.

According to the fourth embodiment, in S41, the brightness values Bvb and Bvc are calculated, and then the brightness value Bv is calculated as an average of weighted average of the brightness values Bvb and Bvc. Alternatively, one of the brightness values Bvb and Bvc (e.g., Bvc) is uses as the brightness value Bv.

In S43 and S44, the exposure parameters are calculated based on the brightness value Bv, similarly to the first, second or third embodiment.

In S45, whether the daylight synchro-flash photographing is executed is judged as described below.

If both the following conditions (5) and (6) are satisfied, it is judged that the daytime synchro-flash photographing executed.

$$Bv>8; \tag{5}$$

and $$(Bvb-Bvc)>2. \tag{6}$$

In the foregoing embodiments, the brightness value Bv and/or a difference between two brightness values (Bvb-Bvc) are compared with threshold values to determine whether the daylight synchro-flash photographing is executed. The threshold values are not limited to the values as indicated, but can be modified depending on actual application to various cameras.

Fifth Embodiment

In the fifth embodiment, another multi-point photometry system is employed. Accordingly, brightness in a plurality of divided areas of the object are measured.

Figure 6:
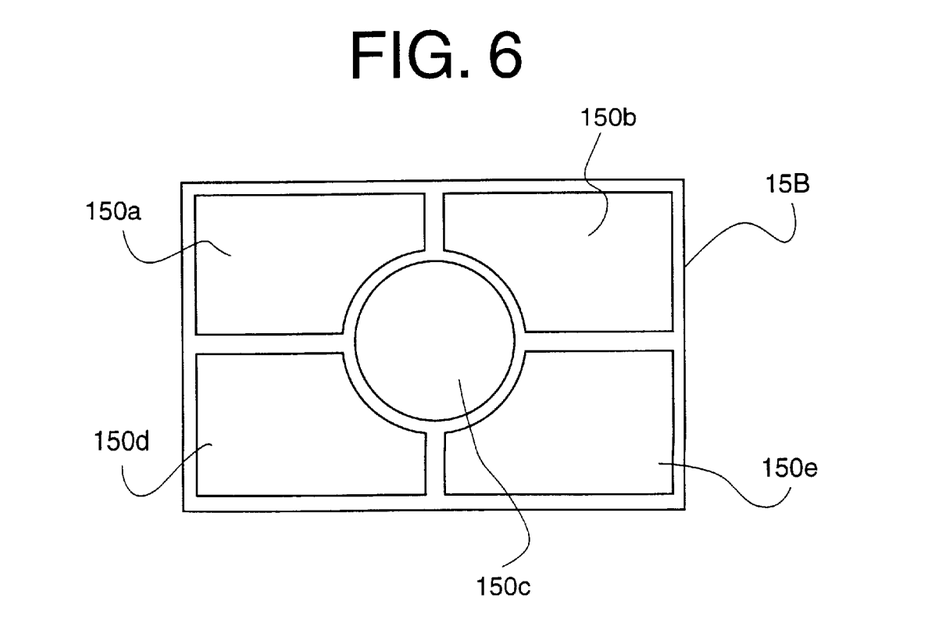
FIG. 6 schematically shows another example of a light receiving surface of an SPD having a plurality of light receiving areas.

FIG. 6 shows a light receiving surface of an SPD 15B, which is an example of the multi-point photometry system and used instead of the SPD 15A in the second through fourth embodiments.

As shown in FIG. 6, the light receiving surface of the SPD 15B is divided into five areas: a peripheral sensing areas 150a, 150b, 150d and 150e; and a central sensing area 150c. Based on the signals output of the sensing areas 150a through 150e, brightness values Bv1 through Bv5 are obtained, respectively.

An exposure parameters calculation process according to the second embodiment is substantially similar to that of the first embodiment as shown in FIG. 4.

In the second embodiment, in S41, a single brightness value Bv is determined based on the brightness values Bv1 through Bv6 by taking an average value thereof or a weighted average value thereof. Alternatively, the brightness value Bv3 of the central sensing area 150c may be taken as the brightness value Bv for determining the exposure parameters.

In S43 and S44, the exposure parameters are calculated based on the single brightness value Bv, similarly to the second embodiment.

In S45, whether the daylight synchro-flash photographing is executed is judged based on a difference between the brightness values Bva and Bvc.

Specifically, two brightness values Bva and Bvc are determined such that the brightness value Bva equals the greatest value of brightness values Bv1, Bv2, Bv4 and Bv6 which are outputs of peripheral sensing areas 150a, 150b, 150d and 150e, respectively, and Bvc equals Bv3 which is the output of the central sensing area 150c, and if condition (7) is satisfied, it is judged that the daylight synchro-flash photographing is executed. In this embodiment, the brightness value Bva may be determined as a predetermined one of the brightness values Bv1, Bv2, Bv4 and Bv6 which correspond to peripheral sensing areas 150a, 150b, 150d and 150e, respectively.

$$(Bva-Bvc)>2 \tag{7}$$

That is, if the brightness value Bva corresponding to the brightest one of the peripheral areas 150a, 150b, 150d and 150e is greater than the brightness value Bvc corresponding to the central area 150c by two, it is judged that the daylight synchro-flash photographing is executed.

Sixth Embodiment

The sixth embodiment is a modification of the fifth embodiment, and accordingly, a modification of the second embodiment, which employs the multi-point photometry system employing the PSD 15B shown in FIG. 6. A process for calculating the exposure parameters is substantially similar to that of the fifth embodiment.

According to the third embodiment, in S41, the brightness value Bv is calculated as an average or weighted average of the brightness values Bv1 through Bv6. Alternatively, a predetermined one of the brightness values Bv1 through Bv6 (e.g., Bv3) may be used as the brightness value Bv.

In S43 and S44, the exposure parameters are calculated based on the brightness value Bv, similarly to the fifth embodiment.

In S45, whether the daylight synchro-flash photographing is executed is judged as described below.

The maximum brightness value Bvmax and the minimum brightness value Bvmin are selected from among the brightness values Bv1 through Bv6. If one of the following condition (8) is satisfied, it is judged that the daytime synchro-flash photographing executed.

$$(Bvmax-Bvmin) > 2. \tag{8}$$

The fifth and sixth embodiment, which utilize the PSD 15B having more than two sensing areas, are described as modifications of the second embodiment. However, the other embodiments may also be modified so that the output signals of the PSD having more than two sensing areas are used.

In the description above, when the daylight synchro-flash photographing is executed, the CPU 16 decreases the aperture value Av. However, it may also be possible to decrease the time value Tv or both. Thus, by decreasing at least one of the time value Tv or the aperture value Av, the image obtained by the daylight synchro-flash photographing is improved.

The present disclosure relates to the subject matter contained in Japanese Patent Application No. HEI 10-114903, filed on Apr. 24, 1998, which is expressly incorporated herein by reference in its entirety.

What is claimed is:

1. An exposure control system for a camera provided with a strobe, comprising:
    a photometry system that measures brightness of an object;
    an exposure parameter determining system that determines exposure parameters in accordance with the brightness detected by said photometry system;
    a judging system that judges whether a daylight synchro-flash photographing is executed; and
    an exposure parameter changing system that changes at least one of the exposure parameters determined by said exposure parameter determining system when it is judged that the daylight synchro-flash photographing is executed.

2. The exposure control system according to claim 1, wherein said exposure parameters include an aperture value Av and a time value Tv of an APEX system.

3. The exposure control system according to claim 2, wherein said exposure parameter changing system decreases at least one of said aperture value Av and said time value Tv.

4. The exposure control system according to claim 3, wherein said exposure parameter changing system decreases the aperture value Av when the daylight synchro-flash photographing is executed.

5. The exposure control system according to claim 3, wherein said exposure parameter changing system decreases the time value Tv when the daylight synchro-flash photographing is executed.

6. The exposure control system according to claim 1, wherein said photometry system includes a single-point photometry system for obtaining a brightness value, and wherein said judging system judges that the daylight synchro-flash photographing is executed when conditions (a) and (b) are satisfied:
    (a) the strobe is used; and
    (b) said brightness value is greater than a predetermined value.

7. The exposure control system according to claim 1,
wherein said photometry system includes a multi-point photometry system for obtaining at least two brightness values corresponding to a central area and a peripheral area of a photographing frame, and
wherein said judging system judges that the daylight synchro-flash photographing is executed when conditions (c) and (d) are satisfied:
    (c) the strobe is used; and
    (d) a subtraction of the brightness value corresponding to the central area from the brightness value corresponding to the peripheral area is greater than a predetermined threshold value.

8. The exposure control system according to claim 1,
wherein said photometry system includes a multi-point photometry system for obtaining at least two brightness values corresponding to a central area and a peripheral area of a photographing frame, a weighted and averaged brightness value being calculated based on said at least two brightness values, and
wherein said judging system judges that the daylight synchro-flash photographing is executed when condition (e) is satisfied, and further, one of conditions (f) or (g) is satisfied:
    (e) the strobe is used;
    (f) the weighted and averaged brightness value is greater than a first predetermined threshold value; and
    (g) a subtraction of the brightness value corresponding to the central area from the brightness value corresponding to the peripheral area is greater than a second predetermined threshold value.

9. The exposure control system according to claim 1,
wherein said photometry system includes a multi-point photometry system for obtaining at least two brightness values corresponding to a central area and a peripheral area of a photographing frame, a weighted and averaged brightness value being calculated based on said at least two brightness values, and
wherein said judging system judges that the daylight synchro-flash photographing is executed when conditions (h), (i) and (j) are satisfied:
    (h) the strobe is used;
    (i) the weighted and averaged brightness value is greater than a first predetermined threshold value; and
    (j) a subtraction of the brightness value corresponding to the central area from the brightness value corresponding to the peripheral area is greater than a second predetermined threshold value.

10. The exposure control system according to claim 1,
wherein said photometry system includes a multi-point photometry system for obtaining a plurality of brightness values corresponding to a plurality of areas within a photographing frame, and
wherein said judging system judges that the daylight synchro-flash photographing is executed when conditions (k) and (m) are satisfied:
    (k) the strobe is used; and
    (m) a difference between two of said plurality of brightness values is greater than a predetermined threshold value.

11. The exposure control system according to claim 10, wherein said two of said plurality of brightness values comprise maximum and minimum brightness values of said plurality of brightness values.

12. The exposure control system according to claim 10, wherein said two of said plurality of brightness values comprise brightness values of a central area of said plurality of areas and a peripheral area of said plurality of areas.

13. A camera, comprising:

a strobe;

a photometry system that measures brightness of an object;

an exposure parameter determining system that determines exposure parameters in accordance with the brightness detected by said photometry system;

a judging system that judges whether a daylight synchro-flash photographing is executed; and an exposure parameter changing system that changes at least one of the exposure parameters determined by said exposure parameter determining system when it is judged that the daylight synchro-flash photographing is executed.

14. A method of controlling exposure of a camera which is provided with a strobe, comprising:

measuring brightness of an object;

determining exposure parameters in accordance with the detected brightness;

judging whether a daylight synchro-flash photographing is executed; and changing at least one of the exposure determined parameters when it is judged that the daylight synchro-flash photographing is executed.

* * * * *